June 4, 1940.  N. R. SPARKS  2,203,272
APPARATUS FOR DETERMINING SEISMIC VELOCITIES
Filed July 8, 1938
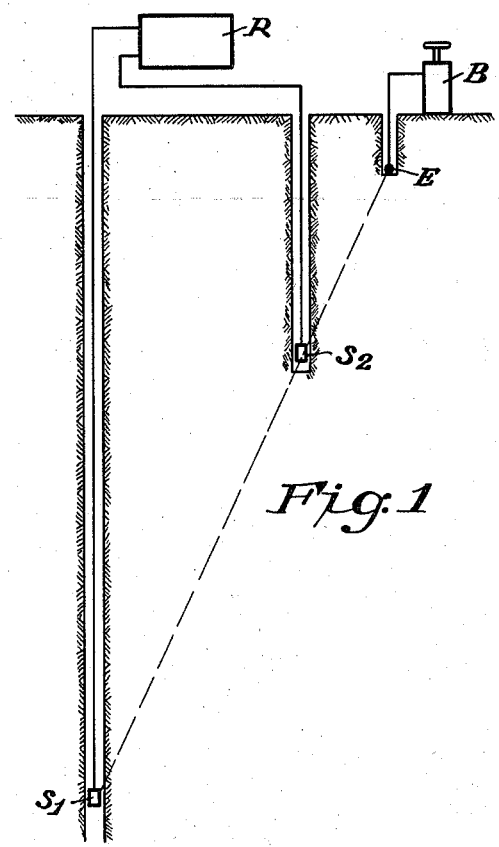
*Fig. 1*
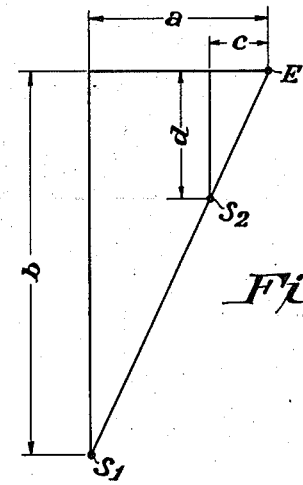
*Fig. 2*
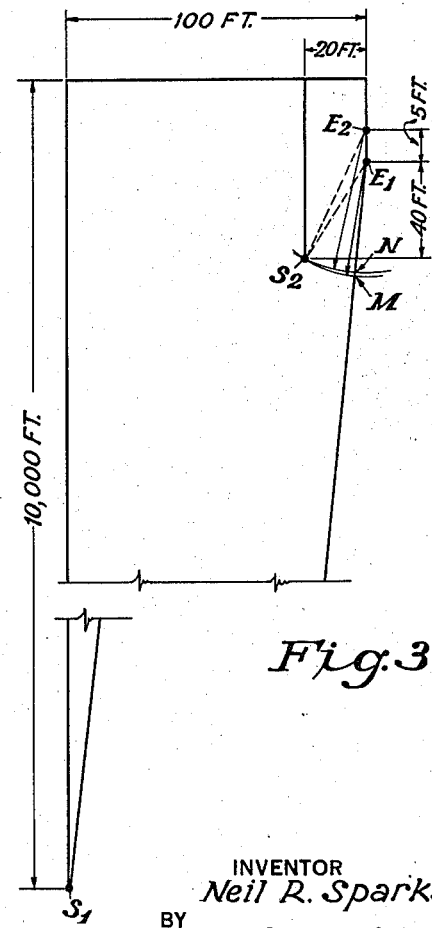
*Fig. 3*
*Fig. 4*
INVENTOR
*Neil R. Sparks*
BY
*Geo. L. Parkhurst*
ATTORNEY Patented June 4, 1940

2,203,272

UNITED STATES PATENT OFFICE 2,203,272

APPARATUS FOR DETERMINING SEISMIC VELOCITIES

Neil R. Sparks, Tulsa, Okla., assignor to Stanolind Oil and Gas Company, Tulsa, Okla., a corporation of Delaware Application July 8, 1938, Serial No. 218,248

4 Claims. (Cl. 181—0.5)

This invention relates to the determination of seismic velocities in underground formations and particularly to improvements in the apparatus or arrangement of equipment used in "well shooting".

In seismic prospecting technique, the accuracy of depth and dip determinations is dependent upon two prime factors, i. e., the accuracy with which elapsed time from the instant at which the explosion takes place until the first arrival of the reflected wave can be determined and the accuracy of the velocity data used for computing the results of these time determinations.

The first of these factors is a function of instrumentation and field technique and is not a matter pertinent to this patent application.

Velocity data used in seismic computations is largely obtained by lowering a wave detecting instrument down a well located in the area of interest, shooting a charge of explosive at a point near the surface of the earth at the top of the well, and measuring the time interval it takes the wave to travel to various depths to which the wave detecting device has been lowered. This is known as well shooting.

A usual procedure is to lower a seismometer, connected by means of a cable to an amplifier and recording device at the surface of the ground, into a well to a depth of say 500 feet, fire a charge of explosive near the top of the well and measure the time between the explosion and the arrival of the wave, then lower the seismometer another five hundred feet and repeat the process until the bottom is reached or depths reached as required. Thus when these times are divided into the corresponding depths a curve can be prepared and a chart is obtained indicative of the average velocities for the particular territory in the vicinity of that well.

The intervals of depth may be made greater or less than the 500 feet mentioned, dependent upon the amount of detail desired for the curve, however, there is no necessity of making these intervals too small unless certain errors in operation are eliminated as further mentioned in this disclosure and in any event intervals should not be shorter than the time intervals can be read with accuracy upon the records.

Since it is not consistent with explosive efficiency to place the charge of explosive directly on the surface of the ground or even in the weathered layer immediately adjacent to the surface of the ground, it is desirable to drill a hole through the weathered layer into the unweathered stratum below and to detonate the explosive charge in this bore hole. This hole is usually placed about 100 feet away from the well itself.

The instant at which the explosion takes place is obtained in a manner similar to that used in seismic prospecting whereby the recording device is connected electrically to the blasting machine, so that the surge of current when the circuit is broken by the explosion is recorded on the record. The distance between the explosion point and the well seismometer divided by the elapsed time from the instant of explosion to the time the wave actuates the well seismometer gives average velocities over the path between the explosion point and the well seismometer.

It will be understood that the accuracy of the average velocity used in computing the curves depends upon three factors:

(a) The accuracy with which the distance from the explosion point to the seismometer in the well is known;

(b) The accuracy with which the exact time of the explosion is known; and (c) The accuracy with which the time of arrival of the wave at the seismometer can be determined.

The third item is a problem of instrumentation and with a seismometer of proper characteristics this arrival time can be determined with great accuracy.

On the other hand the first two items are subject to very substantial errors in many cases. The explosive charge cannot always be placed with accuracy and it may become displaced after the rods for lowering the charge have been removed or stoppages of the hole due to previous explosions may make it impossible to place the charge at the same depth each time. Therefore, corrections are necessary to compensate for these variables.

Again there are frequent variations in the time interval between the blasting circuit surge and the actual explosion time and this introduces serious errors.

The object of this invention is to provide an apparatus or arrangement of equipment whereby the errors due to the above mentioned causes are entirely eliminated and velocity determinations can be obtained with greater accuracy than has hitherto been possible. Other and more detailed objects, uses and advantages of my invention will become apparent as the description thereof proceeds.

My invention will be described with particular reference to the accompanying drawing which forms a part of this specification and in which like reference characters indicate corresponding parts.

Figure 1 is a diagrammatic elevation illustrating my invention;

Figure 2 is a geometric diagram corresponding to Figure 1;

Figure 3 is another geometric diagram illustrating certain mathematical relationships in connection with my invention; and Figure 4 is a diagrammatic elevation illustrating one aspect of my invention.

Essentially the invention to be described consists in placing a reference seismometer at a point near the explosion point and in the path between the source of the waves and the well seismometer as illustrated by Figure 1 where E is the shot point, $S_1$ the well seismometer and $S_2$ the reference seismometer. Blaster B is used to fire the explosive charge located at shot point E. The depths of the reference seismometer and the well seismometer are known and the length of path between $S_1$ and $S_2$ can be ascertained with considerable accuracy. The wave in its transit from the explosion point first strikes the reference seismometer $S_2$ and then the well seismometer $S_1$. The time it takes for the wave to pass between these two points can be recorded with accuracy independent of any of the factors of error in the firing circuit. This is accomplished by recorder R which can suitably be of the type conventionally used in seismic surveying; the impulses from the two seismometers being amplified independently, fed to separate oscillograph elements and recorded on a common strip.

In order for the reference seismometer to be on the exact wave path from the explosive to the well seismometer it would still be necessary to know the exact depth of the explosive charge and the depth of the reference seismometer should be changed for each depth of the well seismometer. This relationship is shown in Figure 2 where $a$ = distance of the shot point from the well;
$b$ = depth of the well seismometer below the shot point;
$c$ = distance of the reference seismometer hole from the shot hole; and
$d$ = depth of the reference seismometer below the shot point.

By similarity of triangles $$\frac{a}{b} = \frac{c}{d}$$

and $$d = \frac{bc}{a}$$

As the reference seismometer hole must pass by the shot point it is apparent that there must be an appreciable separation at this point in order that the reference seismometer hole will not be collapsed by the force of the explosion. Although the reference seismometer hole can be cased at the point where it is nearest to the explosion point E, it cannot usually be placed closer than 10 feet to the shot point hole, i. e. $c$ should be at least 10 feet.

In order to insure that the main well in which velocity determinations are being made is not injured by the explosions it is customary that the distance $a$ in Figure 2 be not less than 100 feet.

Thus assuming that a measurement of velocity is to be made down to a depth $b$ of 8000 feet with dimensions as given above for locations of shot and reference seismometer holes; a depth $d$ of 800 feet would be required for the reference seismometer hole. However, the drilling of holes to such depths is expensive and it can be shown that no appreciable error is introduced by making reasonable deviations from the above mentioned ideal conditions.

For the purpose of determining the error introduced by such deviations we will assume a setup such as shown by Figure 3 where the shot hole is assumed to be 100 feet from the well and the reference seismometer hole is 20 feet from the shot hole in a direction toward the well and 40 feet below the level of the shot point. We will assume an extreme depth of 10,000 feet for the well seismometer below the shot point.

We will also assume that the time for a wave to travel from the shot point to the reference seismometer $S_2$ is the same as the time for it to travel from the shot point to an equidistant point on the line between the shot point and the well seismometer $S_1$ as indicated in Figure 3, i. e. we will assume that the time required for a wave to travel from $E_1$ to $S_2$ is the same as that required to travel the equal distance from $E_1$ to M. Similarly we will assume that $T_{E_2-S_2} = T_{E_2-N}$ where these symbols represent the times required for wave travel between the points indicated by the subscripts.

Thus the time to be used in computing average velocity down the well will be the difference in time between wave arrivals at the reference seismometer $S_2$ and the well seismometer $S_1$ and the distance will be the distance from the shot point to the well seismometer minus the distance from the shot point to the reference seismometer. For example in Figure 3, $T_{E_1-S_1} - T_{E_1-N}$.

Thus for the case cited we find the following values:

| | Feet |
|---|---|
| Distance from $E_1$ to $S_1$ | 10000.3 |
| Distance from $E_1$ to $S_2$ | 44.72 |
| Wave path for computation purposes | 9955.58 |

Now we will assume that the shot point has been moved up the hole for a distance of five feet to $E_2$ the distances will then be changed as follows:

| | Feet |
|---|---|
| Distance from $E_2$ to $S_1$ | 10005.3 |
| Distance from $E_2$ to $S_2$ | 49.24 |
| Wave path for computing purposes | 9956.06 |

We thus see that a change in placement of explosive charge of five feet makes a change of only 9956.06 − 9955.58 = .48 feet in the distance used for computing the velocities. The error in time would be of the order of 0.0001 second which is inappreciable.

The reference seismometer can, of course, be lowered a few hundred feet into the bore hole itself where it will remain stationary during the shooting operation. This procedure is objectionable, however, due to the possibility that it may foul the line to the lower seismometer.

Also it will be apparent that while the reference seismometer hole should preferably be between the shot hole and the main well this is not always absolutely essential. The three bore holes should, of course, be as close together as convenience and safety will permit since the depth of the reference seismometer bore hole is thus minimized.

It will usually be necessary to case the hole used for the reference seismometer to prevent cave-in or collapse due to the proximity of the explosive forces. However, this casing should not be extended all the way down to the reference seismometer as the shortest time path would then be more or less directly across to and down the high velocity well casing. This casing break would obscure the arrival of the wave directly from the shot point to the reference seismometer.

This point can be more fully understood by reference to Figure 4 where the direct wave would be via the path $$\sqrt{c^2+d^2}$$

while the casing wave would be via the path $e$—$z$—$y$. The angle $\theta$ which determines this latter path is itself determined by the equation:

$$\sin \theta = \frac{V_1}{V_2}$$

$V_1$ is the velocity of sound in the earth material and $V_2$ is the velocity of sound in the well casing material. The necessary condition is that $$T\sqrt{c^2+d^2} < (T_e + T_z + T_y)$$

Where $$T\sqrt{c^2+d^2}$$

$T_e$, $T_z$ and $T_y$ represent times of travel over the paths denoted by the respective subscripts.

Referring to Figure 4 the length of these paths can be derived as follows:

$$e = \frac{c}{\cos \theta},$$

$$w = c \tan \theta,$$

$$z = x - w = x - c \tan \theta, \text{ and}$$

$$y = d - x.$$

The times of travel would therefore be:

$$T\sqrt{c^2+d^2} = \frac{\sqrt{c^2+d^2}}{V_1},$$

$$T_e = \frac{c}{V_1 \cos \theta},$$

$$T_z = \frac{x - c \tan \theta}{V_2}, \text{ and}$$

$$T_y = \frac{d-x}{V_1},$$

The limiting case would be where the wave via the casing arrives at the same time as the wave via the direct wave path $$\sqrt{c^2+d^2}$$

or:

$$T\sqrt{c^2+d^2} = T_e + T_z + T_y.$$

Substituting the values of these times as given above and solving for $x$ we have:

$$x = \frac{V_2 \left( d + \frac{c}{\cos \theta} - \sqrt{c^2+d^2} \right) - V_1 c \tan \theta}{V_2 - V_1}$$

In other words, the casing should always extend below the point opposite the level of the explosive charge by an amount less than that given by the formula above.

The velocity of the wave in iron well casing is about 15,000 feet per second and the velocity in the unweathered layer adjacent to the shot point and reference seismometer is usually of the order of 6,000 feet per second. Using these values of velocity and the spacings mentioned in the previous example we find that the casing should extend less than 22 feet below the level of the shot point under these conditions and 10 to 15 feet would be appropriate.

While I have described my invention with reference to certain examples and preferred embodiments thereof it is to be understood that these are by way of illustration only and I do not mean to be bound thereby but only by the appended claims which should be construed as broadly as the prior art will permit.

I claim:

1. Apparatus for determining seismic wave velocities comprising a source or seismic waves located beneath but relatively close to the surface of the earth, a reference seismometer located below said source and separated from said source by a relatively large vertical distance and a substantial but relatively small horizontal distance, a well seismometer located below said reference seismometer and separated from said reference seismometer and from said source by substantial but relatively small horizontal distances, and by vertical distances which are large relative to all of the distances previously mentioned, the direct wave path from said source to said reference seismometer being substantially equivalent as to seismic wave travel time with the same length of path starting from said source and measured in the direction of said well seismometer, and means associated with said seismometers for determining the time interval between wave arrivals at said two seismometers.

2. Apparatus according to claim 1 in which said source and said two seismometers are in substantial alignment with each other.

3. Apparatus for determining seismic wave velocities comprising an explosive charge located below the surface of the earth, means for firing said explosive charge, a reference seismometer located below said explosive charge and horizontally offset from said explosive charge by a small distance, a well seismometer located far below said reference seismometer and horizontally offset from said explosive charge by a distance in excess of the horizontal offset of said reference seismometer from said explosive charge, and means associated with both of said seismometers for recording in a single operation on a common record the time interval between seismic wave arrivals at said two seismometers.

4. Apparatus according to claim 3 in which said reference seismometer is located within the walls of a bore hole containing a casing extending downward from above said explosive charge to a point below said explosive charge but not more than the distance $x$ below said explosive charge where $x$ is defined by the equation:

$$x = \frac{V_2 \left( d + \frac{c}{\cos \theta} - \sqrt{c^2-d^2} \right) - V_1 c \tan \theta}{V_2 - V_1}$$

in which $V_2$ is the velocity of sound in the well casing material, $V_1$ is the velocity of sound in the earth material, $d$ is the vertical distance between said explosive charge and said reference seismometer, $c$ is the horizontal distance between said explosive charge and said reference seismometer, and $\theta$ is the angle whose sine is $V_1/V_2$.

NEIL R. SPARKS.